(12) United States Patent
Kang et al.

(10) Patent No.: US 11,951,804 B2
(45) Date of Patent: Apr. 9, 2024

(54) AIR-CONDITIONING DEVICE FOR MOBILITIES AND AIR-CONDITIONING CONTROL SYSTEM FOR MOBILITIES USING THE SAME

(71) Applicants: Hyundai Motor Company, Seoul (KR); Kia Corporation, Seoul (KR)

(72) Inventors: Su Yeon Kang, Seoul (KR); Gee Young Shin, Suwon-si (KR); Dae Hee Lee, Incheon (KR); Myung Hoe Kim, Seoul (KR); Dong Ho Kwon, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 37 days.

(21) Appl. No.: 17/867,015

(22) Filed: Jul. 18, 2022

(65) Prior Publication Data
US 2023/0075474 A1 Mar. 9, 2023

(30) Foreign Application Priority Data

Sep. 8, 2021 (KR) .......................... 10-2021-0119570

(51) Int. Cl.
*B60H 1/00* (2006.01)
(52) U.S. Cl.
CPC .............................. *B60H 1/00871* (2013.01)
(58) Field of Classification Search
CPC ............ B60H 1/00871; B60H 1/00285; B60H 2001/003; B60N 2/01; B60N 2/14
See application file for complete search history.

(56) References Cited

U.S. PATENT DOCUMENTS

| | | | |
|---|---|---|---|
| 9,011,116 B2 | 4/2015 | Li | |
| 2006/0090497 A1* | 5/2006 | Ishikura | F25D 13/067 |
| | | | 62/380 |
| 2013/0330215 A1* | 12/2013 | Li | B05B 9/01 |
| | | | 417/410.1 |
| 2022/0185059 A1* | 6/2022 | Terai | B60H 1/00028 |
| 2022/0250435 A1* | 8/2022 | Wakamatsu | B60H 1/00564 |

FOREIGN PATENT DOCUMENTS

| | | |
|---|---|---|
| JP | 4265046 B2 | 5/2009 |
| JP | 2009-298336 A | 12/2009 |
| JP | 6512027 B2 | 5/2019 |
| JP | 2020-040598 A | 3/2020 |
| JP | 2021-062731 A | 4/2021 |
| KR | 20-1991-0006279 Y1 | 8/1991 |
| KR | 10-2013-0093244 A | 8/2013 |
| KR | 10-2019-0030515 A | 3/2019 |
| KR | 10-2019-0131368 A | 11/2019 |

* cited by examiner

*Primary Examiner* — Marc E Norman
(74) *Attorney, Agent, or Firm* — Morgan, Lewis & Bockius LLP

(57) ABSTRACT

An air-conditioning device for mobilities and an air-conditioning control system for mobilities using the same, which are capable of performing independent air-conditioning control for each seat when a mobility is heated and cooled, thereby preventing wastage of heating and cooling energy by performing individual air conditioning for each seat depending on whether a passenger is seated, and ensuring comfort of all passengers by providing conditioned air to each seat.

19 Claims, 15 Drawing Sheets

AIR-CONDITIONING DEVICE FOR MOBILITIES AND AIR-CONDITIONING CONTROL SYSTEM FOR MOBILITIES USING THE SAME

CROSS-REFERENCE TO THE RELATED APPLICATION

This application claims priority from Korean Patent Application No. 10-2021-0119570, filed on Sep. 8, 2021, in the Korean Intellectual Property Office, the disclosure of which is incorporated herein by reference in its entirety.

TECHNICAL FIELD

The present disclosure relates to an air-conditioning device for mobilities and an air-conditioning control system for mobilities using the same, which are capable of performing independent air-conditioning control for each seat when a mobility is heated and cooled.

BACKGROUND

With the implementation of environment-friendly technology and the emergence of social issues such as depletion of energy resources in recent years, electric vehicles are being developed as a way to solve these problems. An electric vehicle is operated by a motor that outputs power using electricity supplied from a battery. Accordingly, the electric vehicle is in the spotlight as an environment-friendly vehicle since it does not emit carbon dioxide, it is quiet, and the energy efficiency of the motor thereof is higher than that of an engine.

Because such an electric vehicle is additionally provided with an autonomous driving function and is characterized by increased utilization of interior space, the electric vehicle requires an improved heating and cooling system for indoor air conditioning.

That is, a conventional electric vehicle mostly uses a method in which conditioned air is discharged from the front thereof. In this case, the flow of conditioned air is blocked by front seats, thereby providing a limited amount of conditioned air to passengers seated in rear seats.

Accordingly, through rear consoles, conditioned air is provided to passengers seated in rear seats. However, this creates a complicated path for provision of conditioned air and causes the blowing direction from the front to the rear to be fixed.

In addition, future electric vehicles are expected to have slimmed interior front portions in order to increase utilization of interior space, which imposes restrictions on the installation of air conditioners.

As such, when the indoor air conditioning is also performed in an electric vehicle to optimize the indoor environment thereof, the entire interior space is cooled or heated without distinction between seats, which may decrease air-conditioning efficiency and thus waste electrical energy.

Therefore, there is a need to reduce the consumption of heating and cooling energy by optimizing the flow of conditioned air and performing individual air conditioning for each seat.

The foregoing is intended merely to aid in understanding of the background of the present disclosure, and is not intended to mean that the present disclosure falls within the purview of the related art that is already known to those skilled in the art.

SUMMARY

Therefore, the present disclosure has been made in view of the above problems, and it is an object of the present disclosure to provide an air-conditioning device for mobilities and an air-conditioning control system for mobilities using the same, which are capable of performing independent air-conditioning control for each seat when a mobility is heated and cooled, thereby preventing wastage of heating and cooling energy by performing individual air conditioning for each seat depending on whether a passenger is seated, and ensuring comfort of all passengers by providing conditioned air to each seat.

In accordance with an aspect of the present disclosure, the above and other objects can be accomplished by the provision of an air-conditioning device for mobilities, which includes an air-conditioning casing to be disposed in a mobility and permitting air to circulate therethrough, an air conditioner installed in the air-conditioning casing and to cool or heat the circulated air to regulate a temperature of the air, and a slit nozzle blower whose position is switchable in the air-conditioning casing, the slit nozzle blower communicating with the air-conditioning casing to blow the conditioned air whose temperature is regulated by the air conditioner.

The air-conditioning casing may have an intake port for introduction of air therethrough, a plurality of exhaust ports for discharge of air therethrough, and a flow path through which air is circulated between the intake port and the exhaust ports. The air conditioner may be installed in the flow path. The slit nozzle blower may be installed at any one of the exhaust ports.

The exhaust ports of the air-conditioning casing may be classified into a cooling exhaust port and a heating exhaust port. The cooling exhaust port may be disposed in an upper portion of the air-conditioning casing and the heating exhaust port may be disposed in a lower portion of the air-conditioning casing. The slit nozzle blower may be installed at the cooling exhaust port.

The air conditioner may include a blower, a heater, a cooler, and a temperature regulation door for allowing air to pass through the heater or the cooler.

The slit nozzle blower may include a pivot unit installed vertically and rotatably on the air-conditioning casing and permitting the air in the air-conditioning casing to circulate therethrough, and a blowing unit installed laterally and rotatably on the pivot unit and to discharge the air circulated through the pivot unit with directionality.

The air-conditioning casing may include a first drive unit, and the pivot unit may have a rotary shaft connected to the first drive unit so that rotation of the pivot unit is adjusted vertically.

The blowing unit may include a neck part installed laterally and rotatably on the pivot unit and communicating with the pivot unit, and a discharge part connected integrally to communicate with the neck part and having a slit hole for discharge of introduced air therethrough.

The air-conditioning casing may include a second drive unit with a worm gear extending therefrom, and the neck part may have a wheel gear disposed along its circumference, and the worm gear of the second drive unit may be engaged to the wheel gear so that a position of the neck part is adjusted laterally by actuating the second drive unit.

The discharge part may have a polygonal or circular shape and permit air blown through the pivot unit to circulate inwards. The slit hole may be disposed along an inner edge of the discharge part for discharge of air.

The discharge part may have a cross section to permit air to circulate inwards, and a portion of an edge of the cross section is cut off and one end and the other end of the cut portion have an overlapping section. The slit hole may be disposed between the one end and the other end.

The discharge part may extend so that the one end and the other end are parallel and symmetrical in cross section.

The discharge part may have the one end extending obliquely outwards from its inner surface, and may extend obliquely inwards in the overlapping section of the one end and the other end.

The discharge part may have spacers spaced along the inner edge thereof and extending across the inner surface thereof to be connected to the one end and the other end.

The spacers may not be inserted into the slit hole, and may protrude inwards, including the one end and the other end, from the inner surface of the discharge part.

The air-conditioning casing may include a refrigerator to introduce the conditioned air cooled by the air conditioner. The air-conditioning casing may include a switching door for selectively circulating the cooled conditioned air to the refrigerator depending on whether the refrigerator is used.

The slit nozzle blower may be installed rotatably in vertical and lateral directions on the air-conditioning casing, so that the slit nozzle blower is folded by rotating downwards when an air-conditioning function is not used or in a windless mode, the slit blower is deployed by rotating upwards when the air-conditioning function is used, and the slit blower is rotated laterally in response to a blowing direction of the conditioned air.

The air-conditioning casing may be installed between seats of the mobility, and the slit nozzle blower may be rotatably installed to blow air to each of the seats.

In accordance with another aspect of the present disclosure, there is provided an air-conditioning control system for mobilities using the air-conditioning device for mobilities, which includes a sensor unit configured to check whether a passenger is seated in each seat, and a control unit configured to receive seating information of the passenger from the sensor unit and to control the air conditioner and the slit nozzle blower, thereby allowing the slit nozzle blower to blow temperature-regulated conditioned air to the seat in which the passenger is seated.

The air-conditioning casing may be disposed between a front-row seat and a rear-row seat. The control unit may further receive position information of each of the seats. When the front-row seat is switched in position so as to rotate backwards, the control unit may control the slit nozzle blower to blow air to the switched seat.

When the control unit receives, from the sensor unit, information that the passengers are seated in plurality of seats, the control unit may control the slit nozzle blower to sequentially blow air to the individual seats in which the passengers are seated.

When a certain passenger of the passengers seated in the seats restricts air blowing, the control unit may control the slit nozzle blower to avoid the corresponding seat or prevent air to be blown to the corresponding seat.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

Hereinafter, an air-conditioning device for mobilities and an air-conditioning control system for mobilities using the same according to exemplary embodiments of the present disclosure will be described with reference to the accompanying drawings.

Figure 1:
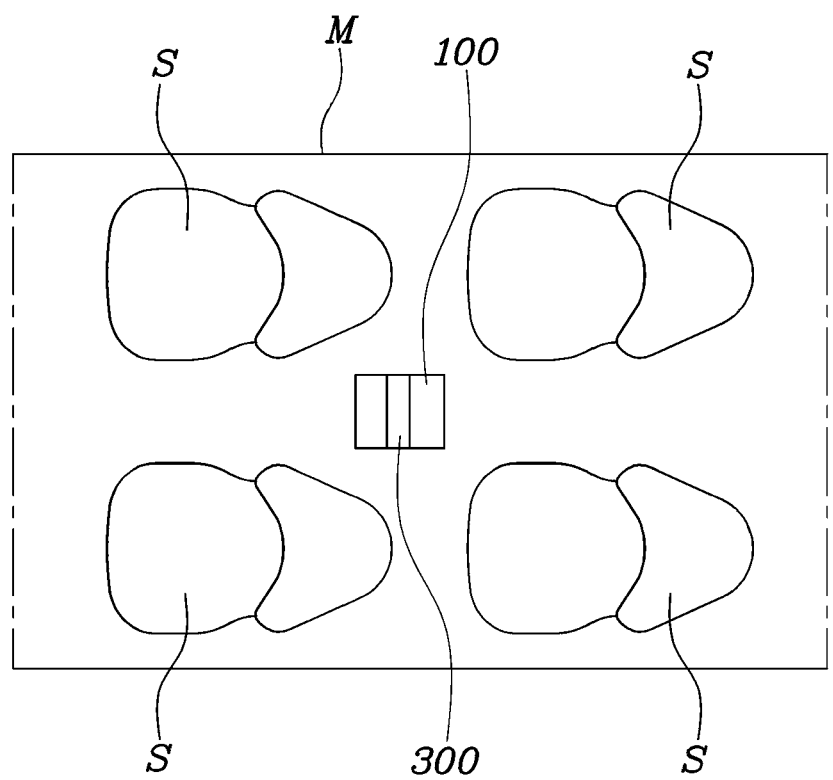
FIG. 1 is a diagram illustrating an interior space in a mobility according to an embodiment of the present disclosure.
Figure 2:
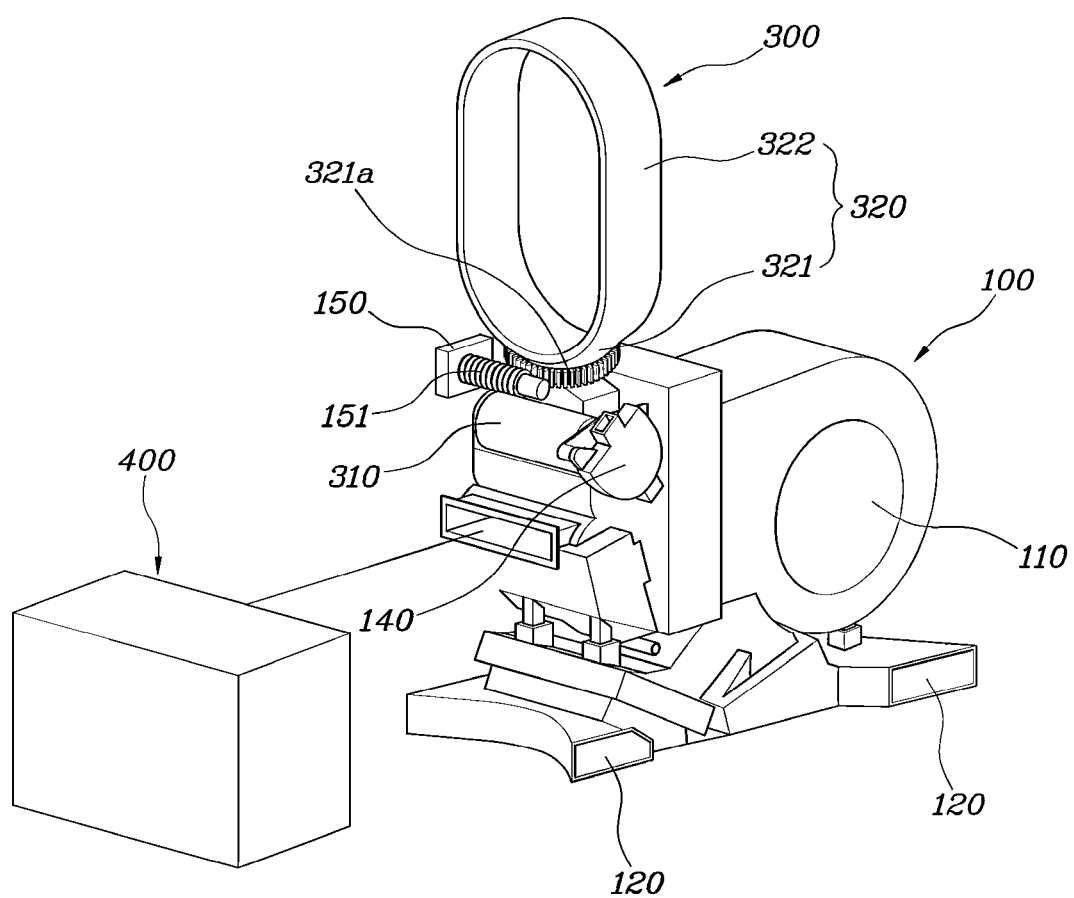
FIG. 2 is a view illustrating a deployed state of an air-conditioning device for mobilities according to the present disclosure.
Figure 3:
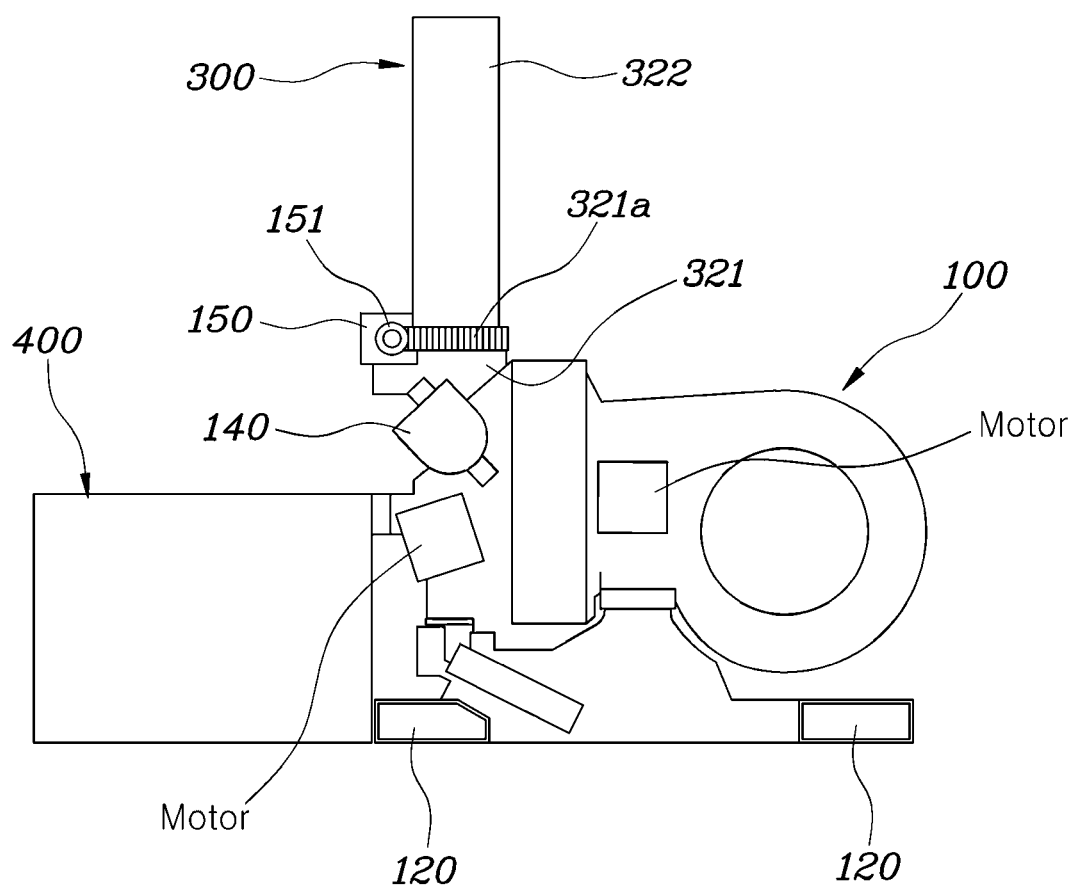
FIG. 3 is a side view of the air-conditioning device for mobilities according to the present disclosure.
Figure 4:
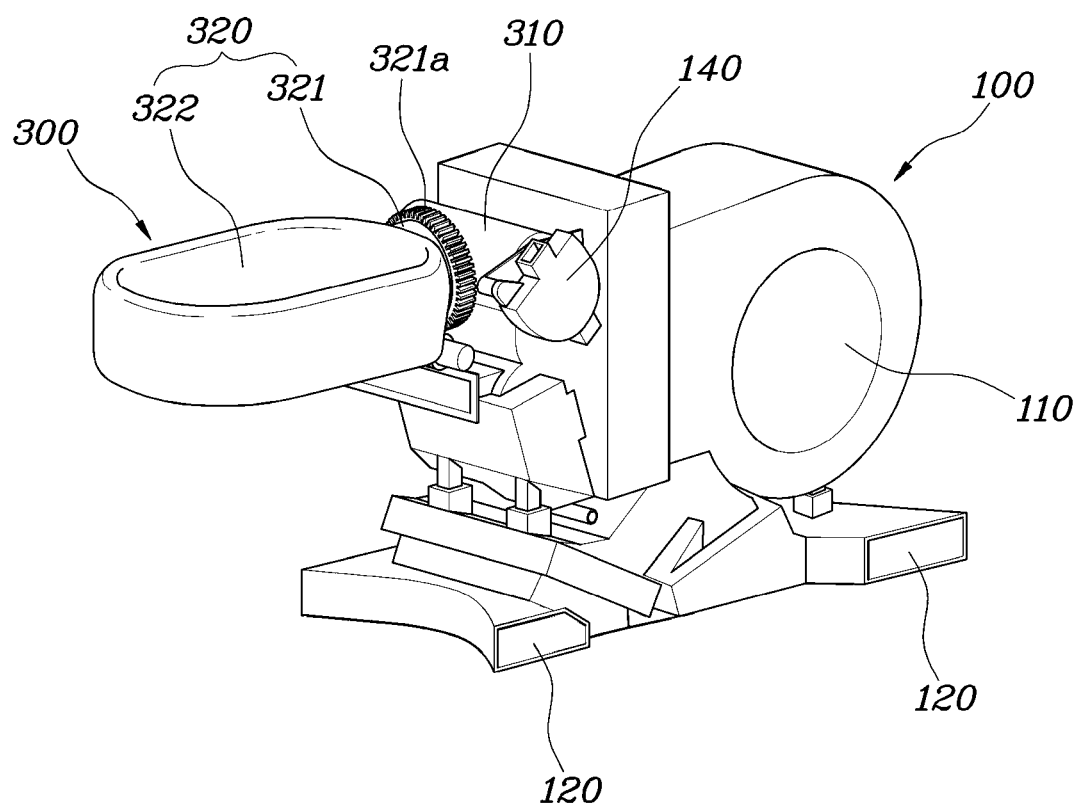
FIG. 4 is a view illustrating a folded state of the air-conditioning device for mobilities of FIG. 1.
Figure 5:
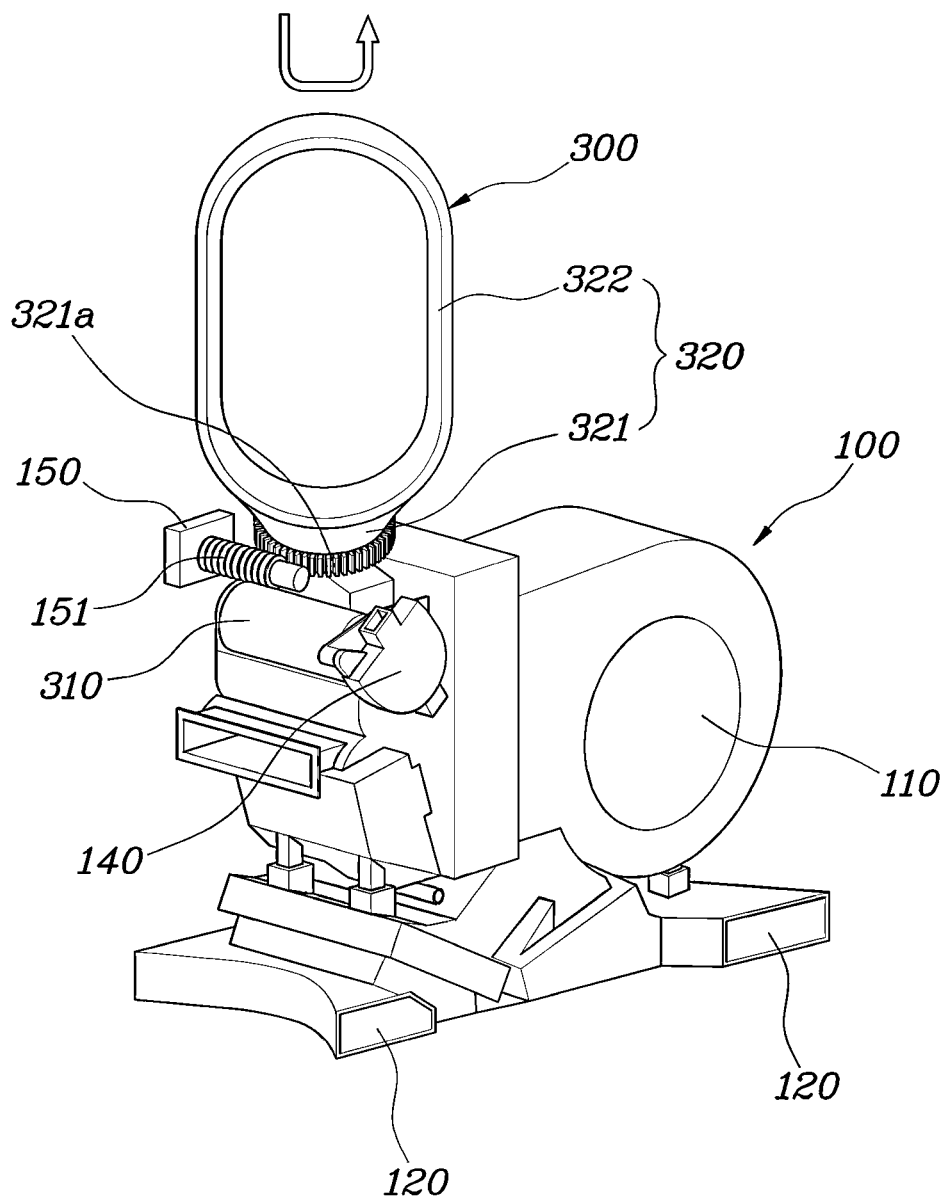
FIG. 5 is a view illustrating a rotated state of the air-conditioning device for mobilities of FIG. 1.

FIG. 1 is a diagram illustrating an interior space in a mobility according to an embodiment of the present disclosure. FIG. 2 is a view illustrating a deployed state of an air-conditioning device for mobilities according to the present disclosure. FIG. 3 is a side view of the air-conditioning device for mobilities according to the present disclosure. FIG. 4 is a view illustrating a folded state of the air-conditioning device for mobilities of FIG. 1. FIG. 5 is a view illustrating a rotated state of the air-conditioning device for mobilities of FIG. 1.

Figure 6:
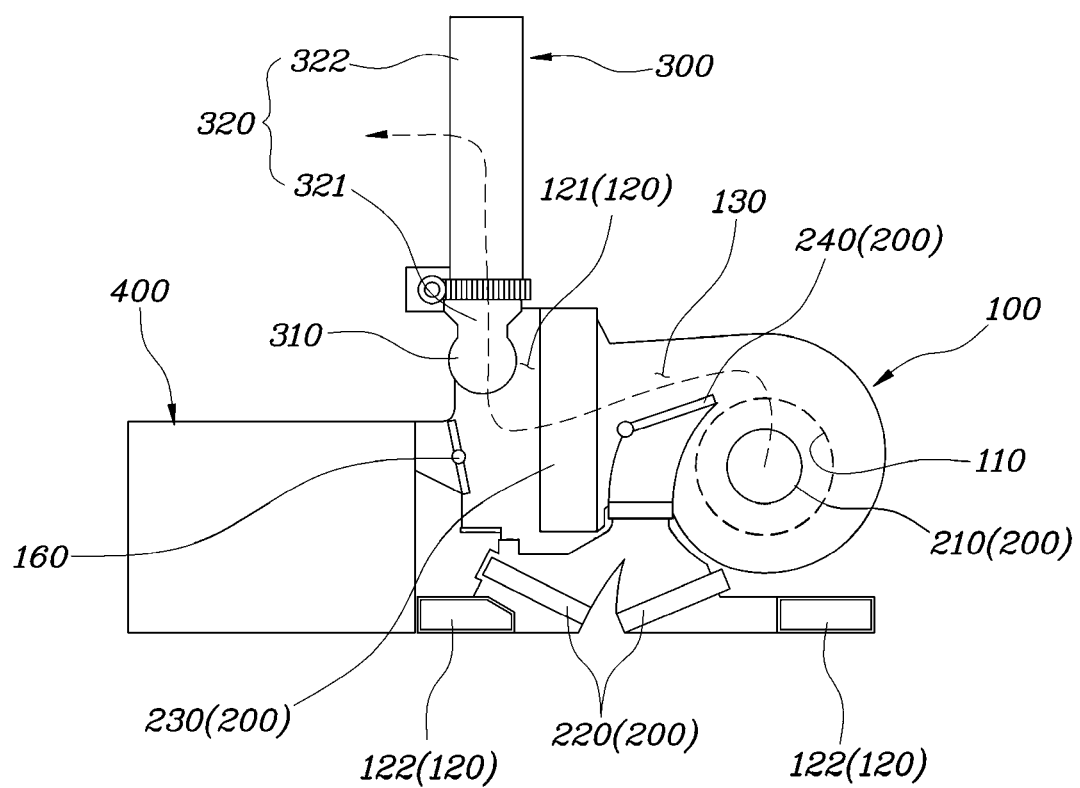
FIG. 6 is a view illustrating an interior of the air-conditioning device for mobilities for illustrating a cooling mode thereof according to the present disclosure.
Figure 7:
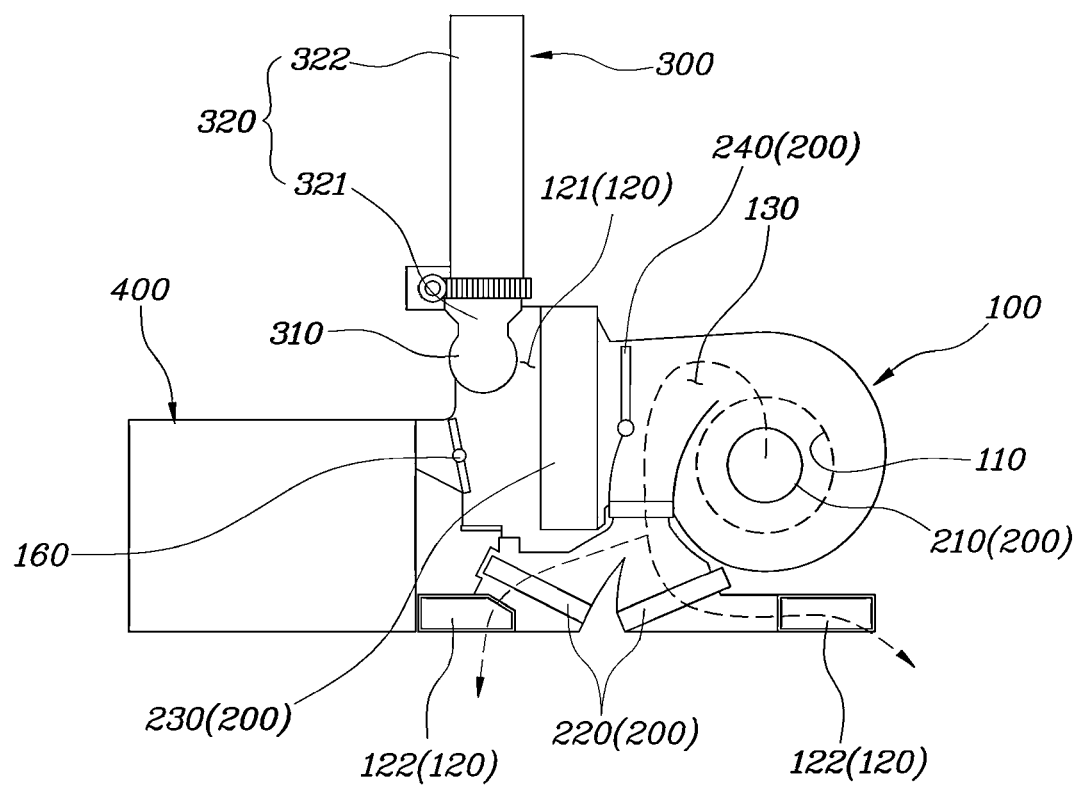
FIG. 7 is a view illustrating an interior of the air-conditioning device for mobilities for illustrating a heating mode thereof according to the present disclosure.

FIG. 6 is a view illustrating an interior of the air-conditioning device for mobilities for illustrating a cooling mode thereof according to the present disclosure. FIG. 7 is a view illustrating an interior of the air-conditioning device for mobilities for illustrating a heating mode thereof according to the present disclosure.

Figure 8:
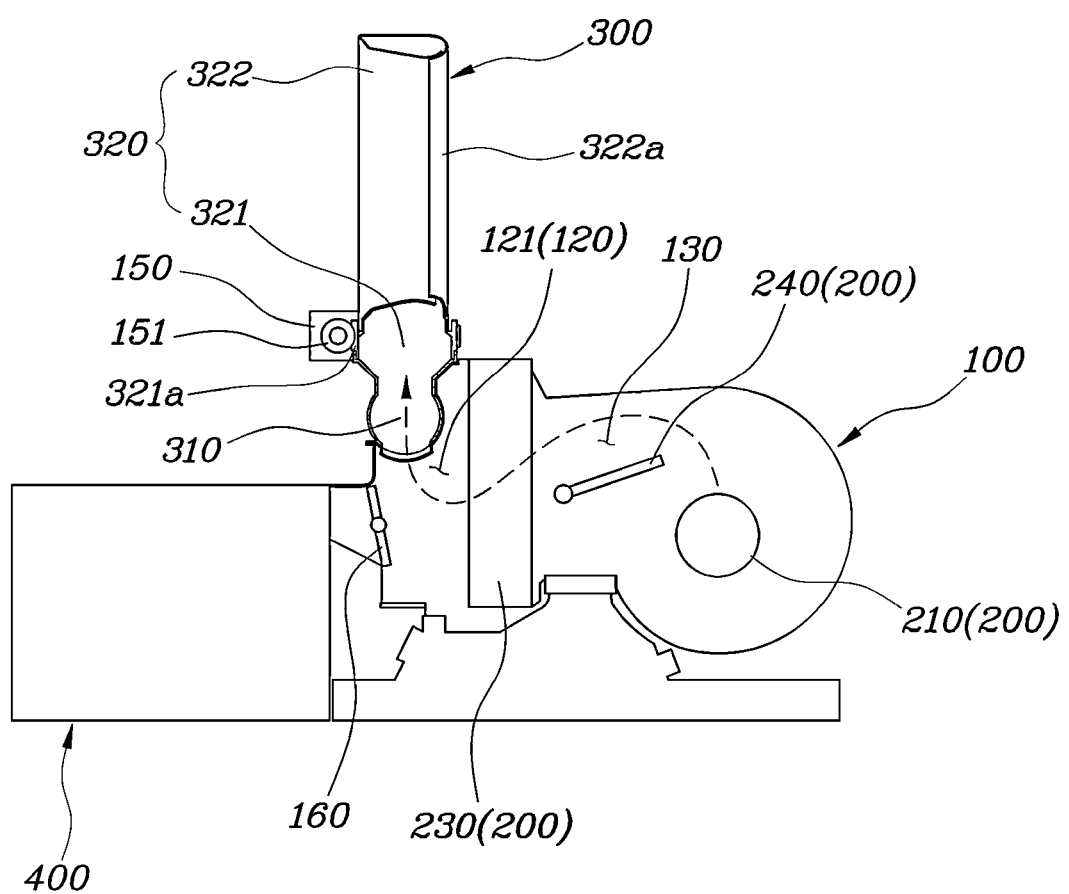
FIG. 8 is a cross-sectional view of the air-conditioning device for mobilities according to the present disclosure.
Figure 9:
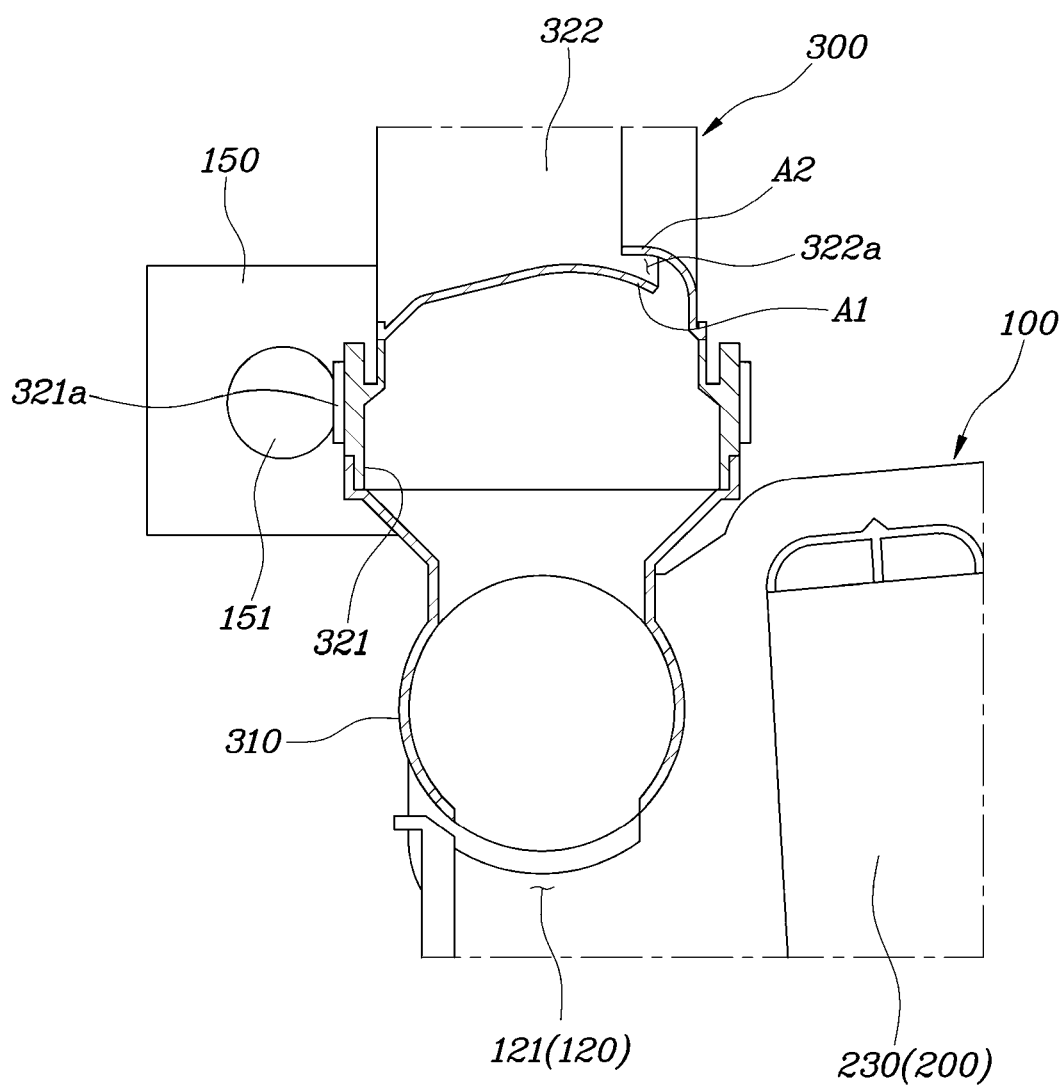
FIG. 9 is a view illustrating a slit nozzle blower according to the present disclosure.
Figure 10:
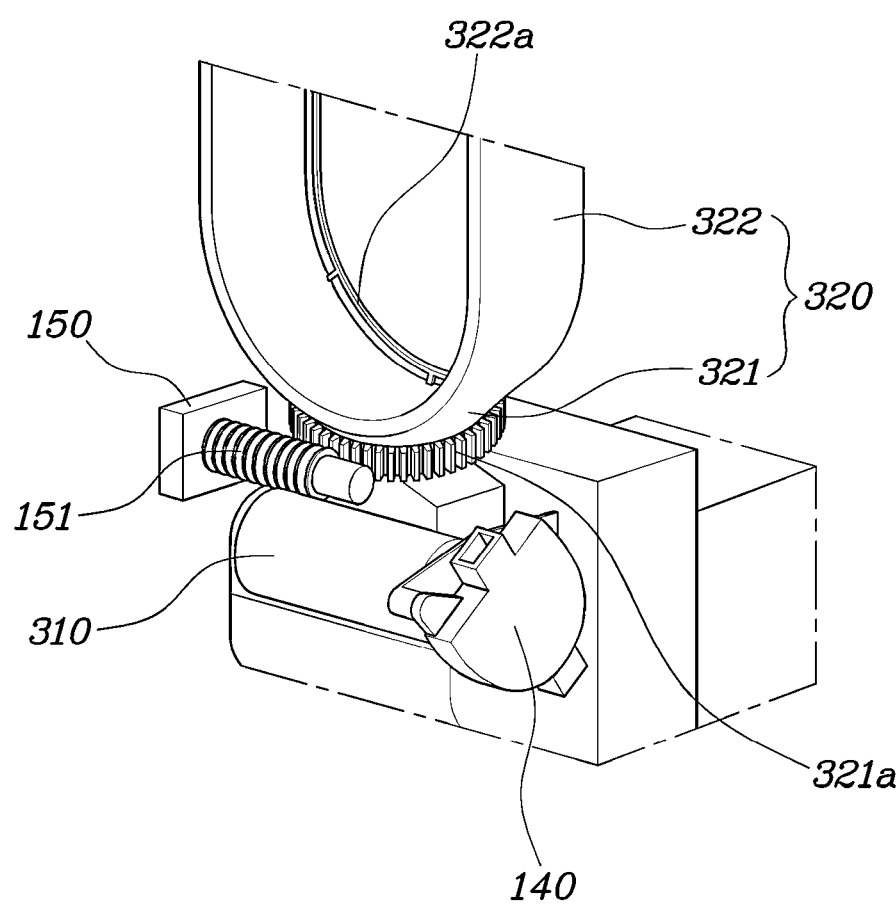
FIG. 10 is a view illustrating a first drive unit and a second drive unit according to the present disclosure.
Figure 11:
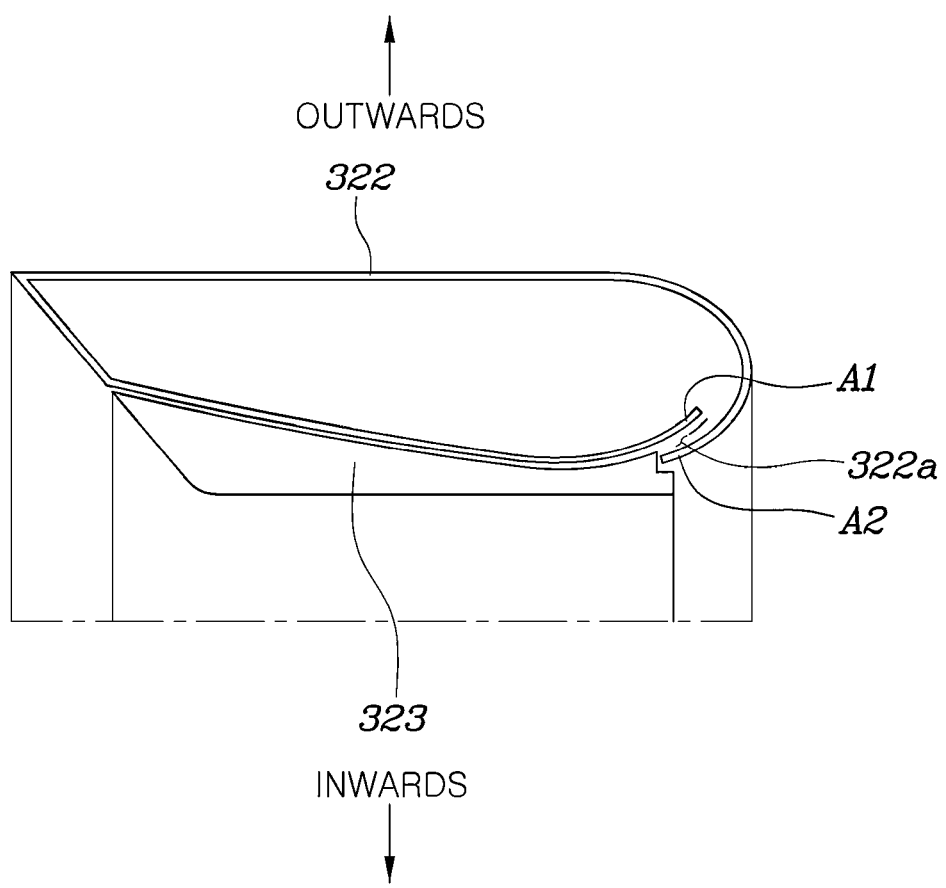
FIG. 11 is a cross-sectional view of a discharge part according to the present disclosure.

FIG. 8 is a cross-sectional view of the air-conditioning device for mobilities according to the present disclosure. FIG. 9 is a view illustrating a slit nozzle blower according to the present disclosure. FIG. 10 is a view illustrating a first drive unit and a second drive unit according to the present disclosure. FIG. 11 is a cross-sectional view of a discharge part according to the present disclosure.

Figure 12:
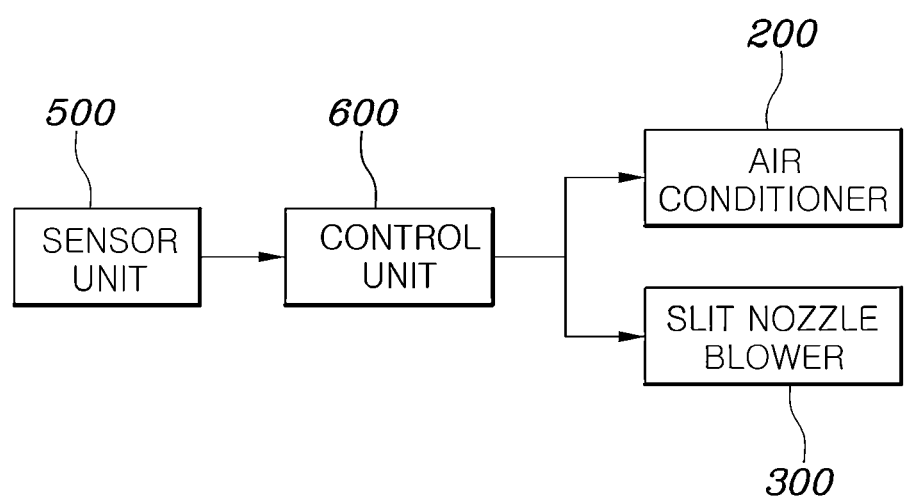
FIG. 12 is a diagram illustrating a configuration of an air-conditioning control system for mobilities according to the present disclosure.
Figure 13:
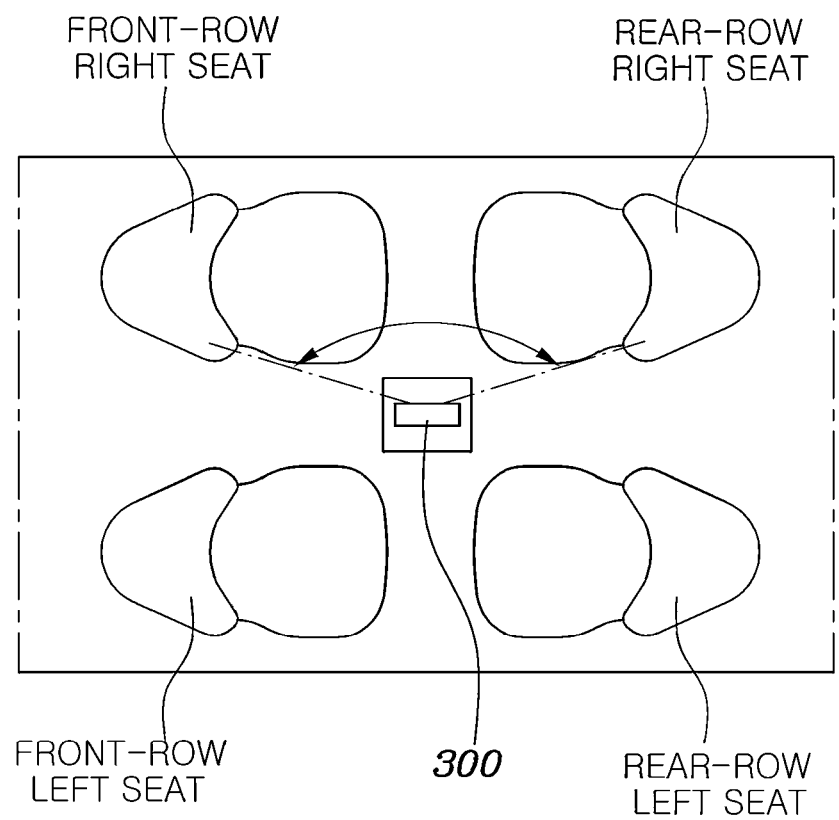
FIG. 13 is a diagram illustrating mobility air-conditioning control according to an embodiment of the present disclosure.
Figure 14:
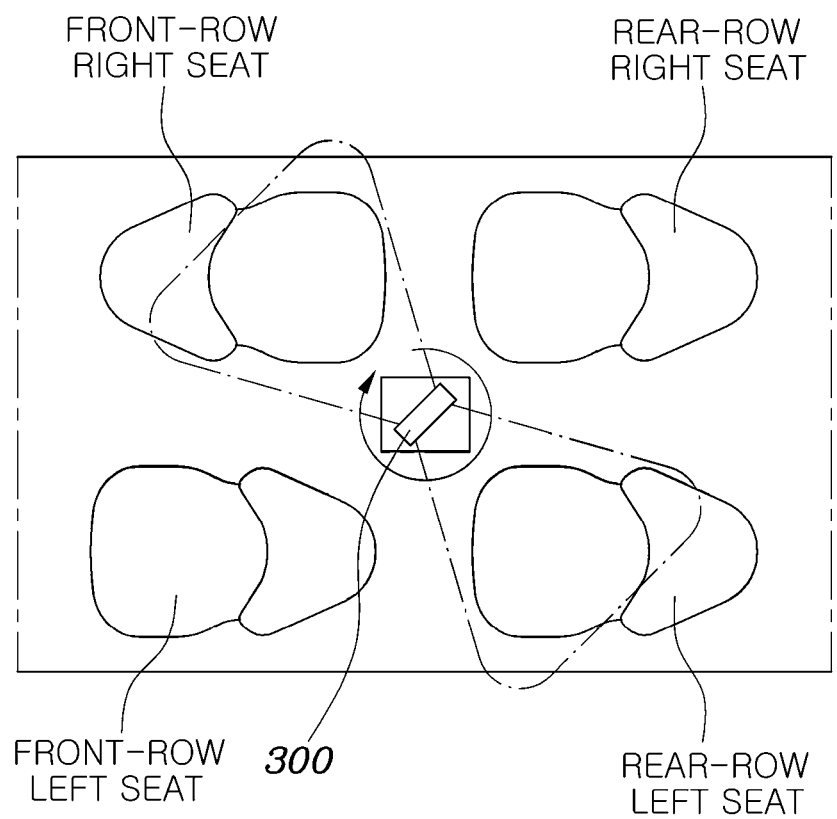
FIG. 14 is a diagram illustrating mobility air-conditioning control according to another embodiment of the present disclosure.
Figure 15:
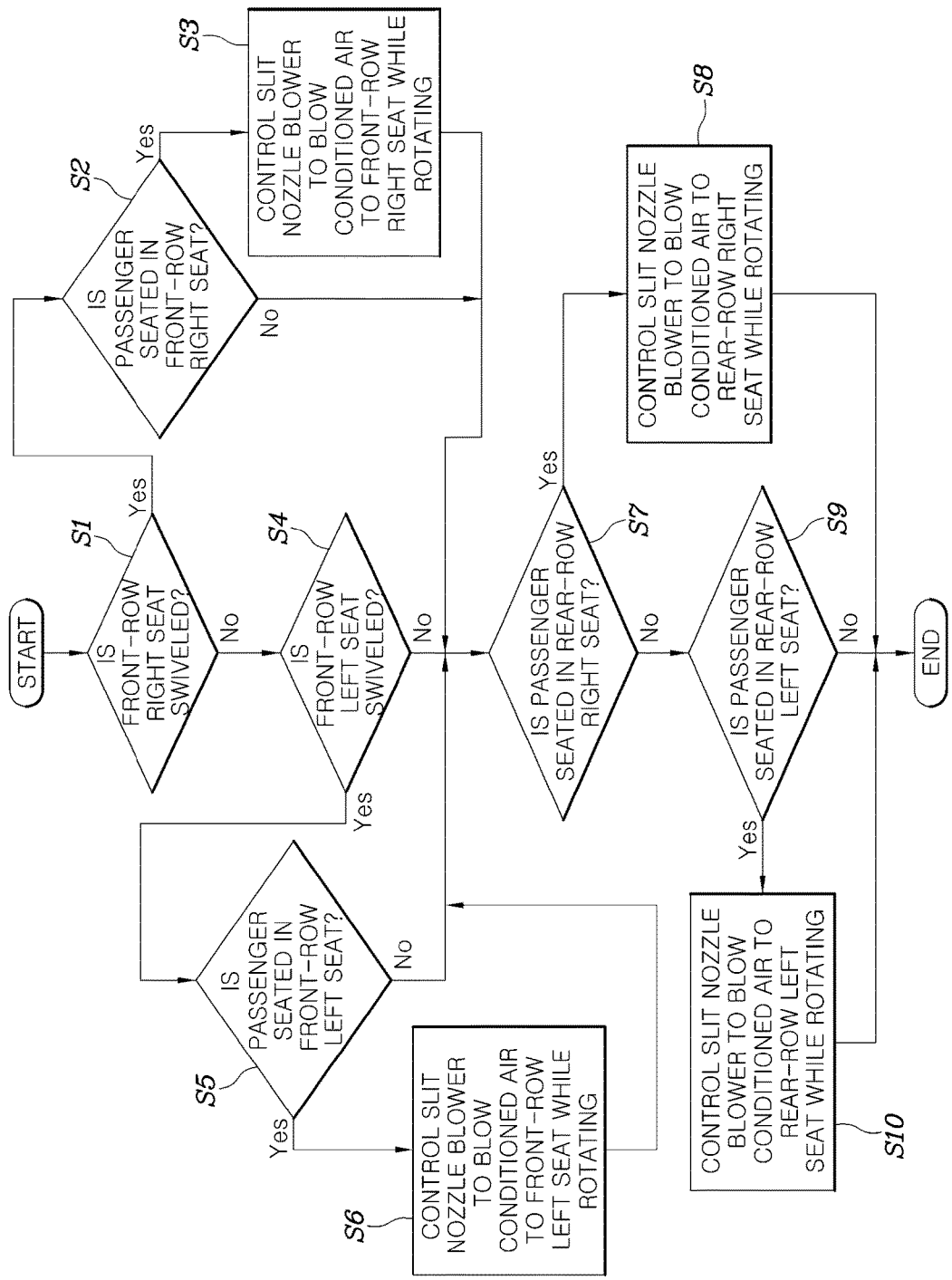
FIG. 15 is a flowchart illustrating control of the air-conditioning control system for mobilities according to the present disclosure.

FIG. 12 is a diagram illustrating a configuration of an air-conditioning control system for mobilities according to the present disclosure. FIG. 13 is a diagram illustrating mobility air-conditioning control according to an embodiment of the present disclosure. FIG. 14 is a diagram illustrating mobility air-conditioning control according to another embodiment of the present disclosure. FIG. 15 is a flowchart illustrating control of the air-conditioning control system for mobilities according to the present disclosure.

As illustrated in FIGS. 1 to 5, the air-conditioning device for mobilities according to the present disclosure includes an air-conditioning casing 100 provided in a mobility M and permitting air to circulate therethrough, an air conditioner 200 installed in the air-conditioning casing 100 and configured to cool or heat the circulated air to regulate a temperature of the air, and a slit nozzle blower 300 whose position is switchable in the air-conditioning casing 100, the slit nozzle blower 300 communicating with the air-conditioning casing 100 to blow the conditioned air whose temperature is regulated by the air conditioner 200.

In an embodiment of the present disclosure, the mobility M may have a plurality of seats S in an interior space therein, and the air-conditioning casing 100 may be disposed between the individual seats S. The air-conditioning casing 100 may be installed through a console to ensure space utilization.

Although the seats S provided in the mobility M are illustrated as front-row left and right seats S and rear-row left and right seats S in order to help understanding of the disclosure disclosed herein, the number of seats S of the mobility M is not limited thereto, and additional seats may be provided.

The air-conditioning casing 100 is installed in the center of the mobility M, and the slit nozzle blower 300 is rotatably installed to blow air to each seat S. Since the air-conditioning casing 100 is installed in the center of the mobility M as described above, conditioned air may be blown to each seat S during rotation of the slit nozzle blower 300.

In addition, additional air-conditioning casings 100 may be configured if the number of seats S is increased, thereby enabling conditioned air to be blown to any seat S.

The air conditioner 200 is installed in the air-conditioning casing 100. That is, since the air introduced into the air-conditioning casing 100 is cooled or heated so as to be regulated in temperature by the air conditioner 200, it may be provided to the interior as temperature-regulated conditioned air.

The slit nozzle blower 300 is installed such that the position thereof is switchable in the air-conditioning casing 100, and the conditioned air, the temperature of which is regulated by the air conditioner 200, is blown by the slit nozzle blower 300. In particular, since the slit nozzle blower 300 is installed such that the position thereof is switchable in the air-conditioning casing 100, it may blow conditioned air to different positions in the interior space in the mobility M.

As such, in the present disclosure, air is introduced into the air-conditioning casing 100 and cooled or heated through the air conditioner 200 to thereby be regulated in temperature, and the temperature-regulated conditioned air is then blown by the slit nozzle blower 300. In particular, since the slit nozzle blower 300 is rotatably installed in the air-conditioning casing 100 to provide conditioned air to a passenger seated in each seat S, it is possible to provide a comfortable environment to the passenger.

Specifically, the air-conditioning casing 100 has an intake port 110 for introduction of air therethrough, a plurality of exhaust ports 120 for discharge of air therethrough, and a flow path 130 through which air is circulated between the intake port 110 and the exhaust ports 120. The air conditioner 200 is installed in the flow path 130, and the slit nozzle blower 300 is installed at any one of the plurality of exhaust ports 120.

As illustrated in FIGS. 3 and 6, air is introduced through the intake port 110 into the air-conditioning casing 100, is regulated in temperature by air conditioner 200 while flowing in the flow path 130, and is then discharged through the exhaust ports 120.

The intake port 110 may be formed on the side or lower portion of the air-conditioning casing 100 for suction of inside air from the interior space, or may extend out of the mobility M for suction of outside air from the outside.

In this way, the air introduced through the intake port 110 of the air-conditioning casing 100 is cooled or heated by the air conditioner 200 while flowing in the flow path 130, to thereby be regulated in temperature, and the cooled or heated conditioned air is discharged through the exhaust ports 120. In particular, since the slit nozzle blower 300 is installed at one exhaust port 120, the conditioned air may be blown to each seat S according to the position of the slit nozzle blower 300.

The air conditioner 200 includes a blower 210, a heater 220, a cooler 230, and a temperature regulation door 240 for allowing air to pass through the heater 220 or the cooler 230.

That is, the air conditioner 200 is configured such that air is circulated through the blower 210 and is regulated in temperature by passing through the heater 220 or the cooler 230 according to the position of the temperature regulation door 240. In this way, the temperature-regulated conditioned air is blown through the exhaust ports 120 of the air-conditioning casing 100 into the interior space in the mobility M. The heater 220 may be a PTC heater or a heat exchanger for circulation of a high-temperature refrigerant, and the cooler 230 may be composed of an EVA core.

Accordingly, the blower 210 may be installed at the intake port 110 of the air-conditioning casing 100, and the temperature regulation door 240 may be installed in the flow path 130 to determine a direction of circulation of sucked air depending on the position of the temperature regulation door 240, so that the conditioned air, the temperature of which is regulated while passing through the heater 220 or the cooler 230, may be discharged through the exhaust ports 120.

The exhaust ports 120 of the air-conditioning casing 100 are classified into a cooling exhaust port 121 and a heating exhaust port 122. The cooling exhaust port 121 is formed in the upper portion of the air-conditioning casing 100 and the heating exhaust port 122 is formed in the lower portion of the air-conditioning casing 100. The slit nozzle blower 300 is installed at the cooling exhaust port 121.

That is, since the constituent heater 220 and cooler 230 of the air conditioner 200 are installed in the air-conditioning casing 100, the exhaust ports 120 are composed of the cooling exhaust port 121 for discharge of the conditioned air, cooled by passing through the cooler 230, therethrough and the heating exhaust port 122 for discharge of the conditioned air, heated by passing through the heater 220, therethrough.

In particular, the slit nozzle blower 300 may be installed at the cooling exhaust port 121, and the heating exhaust port 122 may be disposed in the lower portion of the air-conditioning casing 100. Thereby, the conditioned air cooled by passing through the cooler 230 is blown to each seat S by the slit nozzle blower 300, and the conditioned air heated by passing through the heater 220 is discharged to the interior space from the mower portion of the air-conditioning casing 100.

Accordingly, when it is intended to implement the cooling mode in the present disclosure, as illustrated in FIG. 6, the blower 210 is driven to introduce air into the air-conditioning casing 100 through the intake port 110 and to circulate the introduced air to the cooler 230 by switching the position of the temperature regulation door 240. Thereby, the air is cooled by passing through the cooler 230 and is then discharged to the interior space through the cooling exhaust port 121 by the slit nozzle blower 300.

On the other hand, when it is intended to implement the heating mode in the present disclosure, as illustrated in FIG. 7, the blower 210 is driven to introduce air into the air-conditioning casing 100 through the intake port 110 and to circulate the introduced air to the heater 220 by switching the position of the temperature regulation door 240. Thereby, the air is heated by passing through the heater 220 and is then discharged to the interior space through the heating exhaust port 122.

As such, since the cooled conditioned air is blown by the slit nozzle blower 300, it is possible to improve cooling efficiency for each seat S and to offer comfort for the passenger seated in each seat S. In addition, hot air is not blown directly toward the passenger because the heated conditioned air is discharged from the lower portion of the air-conditioning casing 100, thereby avoiding discomfort.

Meanwhile, as illustrated in FIGS. 2 and 8, the slit nozzle blower 300 includes a pivot unit 310 installed vertically and rotatably on the air-conditioning casing 100 and permitting the air in the air-conditioning casing 100 to circulate therethrough, and a blowing unit 320 installed laterally and rotatably on the pivot unit 310 and configured to discharge the air circulated through the pivot unit 310 with directionality.

As such, the slit nozzle blower 300 includes the pivot unit 310 and the blowing unit 320. The pivot unit 310 is installed vertically and rotatably on the air-conditioning casing 100, and the blowing unit 320 is installed laterally and rotatably on the pivot unit 310.

Thereby, the position of the blowing unit 320 may be switchable in the vertical and lateral directions so that the blowing unit 320 blows conditioned air to different positions, and the blowing unit 320 may be folded downwards through the pivot unit 310 when the slit nozzle blower 300 is not in use.

The pivot unit 310 and the blowing unit 320 may be formed to permit air to circulate therein, thereby enabling air to be blown through the pivot unit 310 and the blowing unit 320 in the air-conditioning casing 100.

In detail, as illustrated in FIGS. 2 and 8, the air-conditioning casing 100 may be provided with a first drive unit 140, and the pivot unit 310 may have a rotary shaft connected to the first drive unit 140 so that the rotation of the pivot unit 310 is adjusted vertically.

That is, the pivot unit 310 is installed to be rotatable about the rotary shaft thereof on the air-conditioning casing 100, and the rotary shaft is connected to the first drive unit 140 installed in the air-conditioning casing 100. Thus, the vertical rotation of the pivot unit 310 may be adjusted by actuating the first drive unit 140.

The first drive unit 140 may be composed of a motor capable of forward and reverse rotation, and may be driven under the control of a control unit 600.

Accordingly, by adjusting the vertical rotation of the pivot unit 310 together with the blowing unit 320, they may be folded and accommodated in the air-conditioning casing 100 or may be deployed so as to permit conditioned air to be blown. In addition, the blowing direction of the blowing unit 320 may be adjusted by adjusting the vertical rotation of the pivot unit 310.

As illustrated in FIG. 8, the blowing unit 320 includes a neck part 321 installed laterally and rotatably on the pivot unit 310 and communicating with the pivot unit 310, and a discharge part 322 connected integrally to communicate with the neck part 321 and having a slit hole 322a for discharge of introduced air therethrough.

That is, the blowing unit 320 includes the neck part 321 and the discharge part 322. The neck part 321 is installed laterally and rotatably on the pivot unit 310, and the discharge part 322 coupled integrally to the neck part 321 is rotated laterally together with the neck part 321 to discharge conditioned air through the slit hole 322a.

As such, the neck part 321 and the discharge part 322 may be formed to permit air to circulate inwards, and the neck part 321 may be rotatably seated on the pivot unit 310. In this case, a sealing ring may be further provided at the connection between the neck part 321 and the pivot unit 310 to prevent air from leaking out.

The air-conditioning casing 100 is provided with a second drive unit 150 with a worm gear 151 extending therefrom, and the neck part 321 has a wheel gear 321a formed along the circumference thereof. The worm gear 151 of the second drive unit 150 is engaged to the wheel gear 321a so that the position of the neck part 321 is adjusted laterally by the actuation of the second drive unit 150.

That is, as illustrated in FIGS. 9 and 10, the neck part 321 of the blowing unit 320 is installed to be rotatable laterally on the air-conditioning casing 100, and has the wheel gear 321a formed along the circumferential surface thereof. The second drive unit 150 installed in the air-conditioning casing 100 has the worm gear 151 extending therefrom, and the worm gear 151 is engaged to the wheel gear 321a. Thus, the second drive unit 150 may be actuated to rotate the wheel gear 321a along with the rotation of the worm gear 151, thereby switching the position of rotation of the neck part 321.

The second drive unit 150 may is composed of a motor capable of forward and reverse rotation, and may be driven under the control of the control unit 600. The worm gear 151 of the second drive unit 150 may extend so that the wheel gear 321a is rotatable by 360° when the worm gear 151 rotates in the state in which it is engaged to the wheel gear 321a.

Meanwhile, as illustrated in FIGS. 2 and 9, the discharge part 322 has a polygonal or circular shape, permits air blown through the pivot unit 310 to circulate inwards, and has a slit hole 322a formed along the inner edge thereof for discharge of air.

The shape of the discharge part 322 may be determined according to the factor of interior design, and the discharge part 322 may have a circular shape for the smooth flow of air therein. The discharge part 322 communicates with the pivot unit 310, and has the slit hole 322a formed along the inner edge thereof so that air is discharged through the slit hole 322a.

The slit hole 322a extends along the inner edge of the discharge part 322, and conditioned air is discharged in a direction passing through the circular discharge part 322. Accordingly, the discharge part 322 creates the Coanda effect by means of the conditioned air discharged from the slit hole 322a, thereby improving blowing efficiency.

Specifically, as illustrated in FIGS. 9 and 11, the discharge part 322 has a cross section to permit air to circulate inwards, and is configured such that a portion of the edge of the cross section is cut off and one end A1 and the other end A2 of the cut portion have an overlapping section. Accordingly, the slit hole 322*a* is formed between the one end A1 and the other end A2.

The discharge part 322 extends so that one end A1 and the other end A2 are parallel and symmetrical in cross section.

That is, as illustrated in FIG. 11, the discharge part 322 may have a blade shape in cross section, and a portion of the edge of the cross section is cut off to form one end A1 and the other end A2. The one end A1 and the other end A2 are spaced apart from each other with an overlapping section therebetween, so that the slit hole 322*a* is formed between the one end A1 and the other end A2.

Thereby, air is discharged through the slit hole 322*a* of the discharge part 322, and the Coanda effect is created by the flow of the conditioned air discharged from the slit hole 322*a*.

Since the discharge part 322 extends so that one end A1 and the other end A2 are parallel and symmetrical, the flow of air discharged through the slit hole 322*a* is stabilized, thereby improving blowing efficiency.

The discharge part 322 has one end A1 extending obliquely outwards from the inner surface thereof, and extends obliquely inwards in the overlapping section of one end A1 and the other end A2. Accordingly, the air discharged through the slit hole 322*a* flows smoothly while moving along the inclined surface of the one end A1. That is, the discharge part 322 has a blade shape in cross section, and the Coanda effect is increased by the direction of the conditioned air discharged through the slit hole 322*a*.

As such, since one end A1 and the other end A2 are curved and extend to form the slit hole 322*a* in the cross section of the discharge part 322 illustrated in FIG. 11, the flow of air is stabilized and the amount of air blown through the slit hole 322*a* is ensured.

In addition, as illustrated in FIGS. 8 to 11, the discharge part 322 has a plurality of spacers 323 spaced along the inner edge thereof and extending across the inner surface thereof to be connected to one end A1 and the other end A2.

The spacers 323 may be spaced at regular intervals along the inner edge of the discharge part 322, and may extend across the inner surface of the discharge part 322, thereby guiding the flow of air discharged through the slit hole 322*a*. The spacers 323 are connected to one end A1 and the other end A2 on the inner surface of the discharge part 322. Accordingly, even if the one end A1 and the other end A2 are cut off and spaced apart from each other, they are kept coupled to each other by the spacers 323 to thereby ensure rigidity.

The spacers 323 are not inserted into the slit hole 322*a*, and protrude inwards, including one end A1 and the other end A2, from the inner surface of the discharge part 322.

That is, the spacers 323 extend across the inner surface of the discharge part 322 and are not inserted into the slit hole 322*a*. Thus, it is possible to minimize interference with the initial flow of air discharged through the slit hole 322*a* and to allow the spacers 323 to guide the flow of air after discharge through the slit hole 322*a*. Thereby, in the present disclosure, the conditioned air discharged through the slit hole 322*a* increases the Coanda effect through the spacers 323, thereby improving blowing efficiency. Since the spacers 323 protrude inwards, including one end A1 and the other end A2, from the inner surface of the discharge part 322, the support rigidity of one end A1 and the other end A2 is ensured by the spacers 323.

Meanwhile, as illustrated in FIG. 3, the air-conditioning casing 100 may be provided with a refrigerator 400 configured to introduce the conditioned air cooled by the air conditioner 200.

The refrigerator 400 may be configured to accommodate beverages and items to be stored at a low temperature therein, and to introduce the air cooled through the air-conditioning casing 100, thereby performing a refrigeration function therein.

Accordingly, the air-conditioning casing 100 is provided with a switching door 160 for selectively circulating the cooled conditioned air to the refrigerator 400 depending on whether the refrigerator 400 is used. That is, the flow path 130 of the air-conditioning casing 100 extends so that the cooled air having passed through the cooler 230 may be circulated to the refrigerator 400, and the switching door 160 is provided on the flow path 130.

Accordingly, when a passenger intends to use the refrigerator 400, the switching door 160 is operated to open the flow path 130 at the refrigerator 400 so that the cooled conditioned air is circulated to the refrigerator 400 to perform the cooling function of the refrigerator 400.

The positions of the above-mentioned temperature regulation door 240 and switching door 160 may be adjusted by the motor provided in the air-conditioning casing 100.

As such, in the air-conditioning device for mobilities according to the present disclosure, the slit nozzle blower 300 is installed rotatably in the vertical and lateral directions on the air-conditioning casing 100. Thus, the position of the slit nozzle blower 300 is adjusted depending on whether the air-conditioning function is used or based on the blowing direction of conditioned air.

That is, as illustrated in FIG. 2, when the air-conditioning function is used, the slit nozzle blower 300 is deployed by rotating upwards so as to blow conditioned air to each seat S.

In addition, as illustrated in FIG. 4, when the air-conditioning function is not used, the slit nozzle blower 300 is folded by rotating downwards so as to ensure the interior space in the mobility M.

Moreover, when a windless mode is used in the air-conditioning function, the slit nozzle blower 300 is folded by rotating downwards so as to prevent conditioned air from being blown directly toward the passenger seated in each seat S.

In addition, as illustrated in FIG. 5, when the air-conditioning function is used, the slit nozzle blower 300 is deployed by rotating upwards and then rotates laterally in response to the blowing direction of conditioned air. Consequently, it is possible to smoothly provide the conditioned air to the passenger seated in each seat S.

Meanwhile, as illustrated in FIG. 12, the air-conditioning control system for mobilities according to the present disclosure includes a sensor unit 500 configured to check whether a passenger is seated in each seat S, and a control unit 600 configured to receive seating information of the passenger from the sensor unit 500 and to control the air conditioner 200 and the slit nozzle blower 300, thereby allowing the slit nozzle blower 300 to blow temperature-regulated conditioned air to the seat S in which the passenger is seated.

The sensor unit 500 may be composed of an infrared sensor, a pressure sensor, and the like, and may check whether or not a passenger is seated in each seat S.

When the passenger intends to regulate the interior temperature, the control unit 600 allows the temperature-regulated conditioned air to be provided to the interior space in the mobility M.

The control unit 600 may allow the slit nozzle blower 300 to be used only when providing conditioned air for cooling, and may allow conditioned air for heating to be provided to the lower portion of the air-conditioning casing 100.

Since the air-conditioning casing 100 is disposed between the respective seats S in the mobility M, the slit nozzle blower 300 may blow conditioned air to any seat S by switching a blowing direction.

The control unit 600 receives, from the sensor unit 500, information about whether or not a passenger is seated in each seat S, and controls the air conditioner 200 and the slit nozzle blower 300 based on the information from the sensor unit 500.

The control unit 600 further receives position information of each seat. When a front-row seat is switched in position so as to rotate backwards, the control unit 600 controls the slit nozzle blower 300 to blow air to the switched seat. That is, when the front-row seat is positioned to face forwards, even if conditioned air is blown toward the front-row seat, the conditioned air is blocked by the seat, which leads to a deterioration in efficiency of conditioned air. Accordingly, when the front-row seat is swiveled and positioned to face backwards, the control unit 600 allows conditioned air to be blown directly toward the passenger seated in the front-row seat, thereby ensuring comfort.

When the control unit 600 receives, from the sensor unit 500, information that the passengers are seated in the plurality of seats S, the control unit 600 controls the slit nozzle blower 300 to sequentially blow air to the individual seats S in which the passengers are seated. In this case, the control unit 600 controls the slit nozzle blower 300 when providing conditioned air for cooling.

In an embodiment, in a state in which front-row left and right seats and rear-row left and right seats are arranged and the air-conditioning casing 100 is disposed in the middle of the seats, the control unit 600 controls the slit nozzle blower 300 to blow conditioned air only to the seat, in which the passenger is seated, among the plurality of seats by means of the swivel state of the front-row left and right seats and the sensor unit 500.

For example, as illustrated in FIG. 13, when passengers are seated only in the front-row right seat and the rear-row right seat in the state in which the front-row right seat and the front-row left seat are swiveled, the control unit 600 controls the air conditioner 200 to regulate the temperature of conditioned air to the temperature required by the passenger or the set temperature, and controls the slit nozzle blower 300 to blow conditioned air only to the front-row right seat and the rear-row right seat by switching the position of the slit nozzle blower 300.

In this way, by setting the blowing direction through the slit nozzle blower 300 according to the swivel state of each seat, and blowing conditioned air through the slit nozzle blower 300 within the range in which the passenger is seated in the seat, it is possible to efficiently provide conditioned air.

In addition, when a certain passenger of the passengers seated in the seats restricts air blowing, the control unit 600 controls the slit nozzle blower 300 to avoid the corresponding seat or prevent air to be blown to the corresponding seat switched.

That is, as illustrated in FIG. 14, in the state in which only the front-row right seat is swiveled, when the passengers are seated in the front-row right seat and the rear-row left seat and the passengers seated in the front-row left seat and the rear-row right seat restrict air blowing, the slit nozzle blower 300 is rotated 360° to blow conditioned air only toward the front-row right seat and the rear-row left seat.

In this way, the control unit 600 may control the slit nozzle blower 300 to selectively blow conditioned air toward each seat and the passenger seated in the seat depending on whether the conditioned air is required. Accordingly, it is possible to improve comfort and convenience for passengers.

Accordingly, the control unit 600 of the present disclosure may perform the control of S1 to S10 as illustrated in the flowchart of FIG. 15.

The air-conditioning device for mobilities and the air-conditioning control system for mobilities using the same having the above-mentioned structure can perform independent air-conditioning control for each seat when the mobility is heated and cooled. Therefore, it is possible to prevent wastage of heating and cooling energy by performing individual air conditioning for each seat depending on whether a passenger is seated, and to ensure the comfort of all passengers by providing conditioned air to each seat.

As is apparent from the above description, the air-conditioning device for mobilities and the air-conditioning control system for mobilities using the same having the above-mentioned structure can perform independent air-conditioning control for each seat when the mobility is heated and cooled. Therefore, it is possible to prevent wastage of heating and cooling energy by performing individual air conditioning for each seat depending on whether a passenger is seated, and to ensure the comfort of all passengers by providing conditioned air to each seat.

Although specific embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. An air-conditioning device for mobilities, comprising:
an air-conditioning casing to be disposed in a mobility and permitting air to circulate therethrough;
an air conditioner installed in the air-conditioning casing and to cool or heat the circulated air to regulate a temperature of the air; and
a slit nozzle blower whose position is switchable in the air-conditioning casing, the slit nozzle blower communicating with the air-conditioning casing to blow the conditioned air whose temperature is regulated by the air conditioner,
wherein the air-conditioning casing has an intake port for introduction of air therethrough, a plurality of exhaust ports for discharge of air therethrough, and a flow path through which air is circulated between the intake port and the exhaust ports, the air conditioner is installed in the flow path, and the slit nozzle blower is installed at any one of the exhaust ports.

2. The air-conditioning device according to claim 1, wherein the exhaust ports of the air-conditioning casing are classified into a cooling exhaust port and a heating exhaust port, the cooling exhaust port is disposed in an upper portion of the air-conditioning casing, the heating exhaust port is disposed in a lower portion of the air-conditioning casing, and the slit nozzle blower is installed at the cooling exhaust port.

3. The air-conditioning device according to claim 1, wherein the air conditioner comprises a blower, a heater, a cooler, and a temperature regulation door for allowing air to pass through the heater or the cooler.

4. The air-conditioning device according to claim 1, wherein the slit nozzle blower comprises:
   a pivot unit installed vertically and rotatably on the air-conditioning casing and permitting the air in the air-conditioning casing to circulate therethrough; and
   a blowing unit installed laterally and rotatably on the pivot unit and to discharge the air circulated through the pivot unit with directionality.

5. The air-conditioning device according to claim 4, wherein:
   the air-conditioning casing includes a first drive unit; and
   the pivot unit has a rotary shaft connected to the first drive unit so that rotation of the pivot unit is adjusted vertically.

6. The air-conditioning device according to claim 4, wherein the blowing unit comprises a neck part installed laterally and rotatably on the pivot unit and communicating with the pivot unit, and a discharge part connected integrally to communicate with the neck part and having a slit hole for discharge of introduced air therethrough.

7. The air-conditioning device according to claim 6, wherein the air-conditioning casing includes a second drive unit with a worm gear extending therefrom, and the neck part has a wheel gear disposed along its circumference, and the worm gear of the second drive unit is engaged to the wheel gear so that a position of the neck part is adjusted laterally by actuating the second drive unit.

8. The air-conditioning device according to claim 6, wherein the discharge part has a polygonal or circular shape and permits air blown through the pivot unit to circulate inwards, and the slit hole is disposed along an inner edge of the discharge part for discharge of air.

9. The air-conditioning device according to claim 8, wherein the discharge part has a cross section to permit air to circulate inwards, and a portion of an edge of the cross section is cut off and one end and the other end of the cut portion have an overlapping section, and the slit hole is disposed between the one end and the other end.

10. The air-conditioning device according to claim 9, wherein the discharge part extends so that the one end and the other end are parallel and symmetrical in cross section.

11. The air-conditioning device according to claim 9, wherein the discharge part has the one end extending obliquely outwards from its inner surface, and extends obliquely inwards in the overlapping section of the one end and the other end.

12. The air-conditioning device according to claim 9, wherein the discharge part has spacers spaced along the inner edge thereof and extending across the inner surface thereof to be connected to the one end and the other end, and wherein the spacers are not inserted into the slit hole, and protrude inwards, including the one end and the other end, from the inner surface of the discharge part.

13. The air-conditioning device according to claim 1, wherein:
   the air-conditioning casing includes a refrigerator to introduce the conditioned air cooled by the air conditioner; and
   a switching door for selectively circulating the cooled conditioned air to the refrigerator depending on whether the refrigerator is used.

14. The air-conditioning device according to claim 1, wherein the slit nozzle blower is installed rotatably in vertical and lateral directions on the air-conditioning casing, so that the slit nozzle blower is folded by rotating downwards when an air-conditioning function is not used or in a windless mode, the slit nozzle blower is deployed by rotating upwards when the air-conditioning function is used, and the slit nozzle blower is rotated laterally in response to a blowing direction of the conditioned air.

15. The air-conditioning device according to claim 1, wherein the air-conditioning casing is installed between seats of the mobility, and the slit nozzle blower is rotatably installed to blow air to each of the seats.

16. An air-conditioning control system for mobilities using the air-conditioning device for mobilities according to claim 1, comprising:
   a sensor unit configured to check whether a passenger is seated in each seat; and
   a controller configured to receive seating information of the passenger from the sensor unit and to control the air conditioner and the slit nozzle blower, thereby allowing the slit nozzle blower to blow temperature-regulated conditioned air to the seat in which the passenger is seated.

17. The air-conditioning control system according to claim 16, wherein:
   the air-conditioning casing is disposed between a front-row seat and a rear-row seat; and
   the controller further receives position information of each of the seats, and when the front-row seat is switched in position so as to rotate backwards, the controller controls the slit nozzle blower to blow air to the switched seat.

18. The air-conditioning control system according to claim 16, wherein when the controller receives, from the sensor unit, information that the passengers are seated in plurality of seats, the controller controls the slit nozzle blower to sequentially blow air to the individual seats in which the passengers are seated.

19. The air-conditioning control system according to claim 16, wherein when a certain passenger of the passengers seated in the seats restricts air blowing, the controller controls the slit nozzle blower to avoid the corresponding seat or prevent air to be blown to the corresponding seat.

* * * * *